(12) United States Patent
Zattler

(10) Patent No.: US 7,168,696 B2
(45) Date of Patent: Jan. 30, 2007

(54) APPARATUS AND METHOD FOR SEPARATING FLAT PARCELED GOODS

(75) Inventor: Oliver Zattler, Sinsheim (DE)

(73) Assignee: Interroll-Holding AG, Sant Antonino (CH)

( * ) Notice: Subject to any disclaimer, the term of this patent is extended or adjusted under 35 U.S.C. 154(b) by 679 days.

(21) Appl. No.: 10/386,460

(22) Filed: Mar. 13, 2003

(65) Prior Publication Data

US 2003/0234158 A1    Dec. 25, 2003

(30) Foreign Application Priority Data

Mar. 19, 2002   (DE)   ................ 102 12 024

(51) Int. Cl.
*B65H 3/04*   (2006.01)
(52) U.S. Cl. .................... 271/10.07; 271/35
(58) Field of Classification Search ............ 271/10.06, 271/10.07, 35; 414/797.6; 198/453, 454, 198/455

See application file for complete search history.

(56) References Cited

U.S. PATENT DOCUMENTS 2,941,653 A    6/1960   Kriemelmeyer, Jr.
5,129,641 A *  7/1992   Long .............................. 271/6
6,135,441 A * 10/2000   Belec et al. ................... 271/35
6,866,258 B1*  3/2005   Golicz .......................... 271/35
2002/0140156 A1* 10/2002 Wilson et al. ........... 271/10.07

FOREIGN PATENT DOCUMENTS

| DE | 76 26 319 U | 8/1977 |
| DE | 26 37 851 CZ | 5/1978 |
| DE | 27 56 172 A1 | 6/1979 |
| DE | 195 47 292 A1 | 6/1997 |
| DE | 196 09 068 A1 | 9/1997 |

\* cited by examiner

*Primary Examiner*—David H. Bollinger
(74) *Attorney, Agent, or Firm*—Blank Rome LLP

(57) ABSTRACT

In order to provide an apparatus for separating flat parceled goods, comprising a driver device with at least one driver surface, which is driven such that the parceled goods can be carried along in a transporting direction by the at least one driver surface, and also comprising a separating device with at least one separating surface for the parceled goods, the separating surface being directed toward the at least one driver surface, which apparatus carries out a separating operation with a high degree of reliability, it is proposed that the separating device is driven such that the at least one separating surface moves, upon contact with a parceled goods article, in the opposite direction to the transporting direction.

40 Claims, 5 Drawing Sheets

APPARATUS AND METHOD FOR SEPARATING FLAT PARCELED GOODS

The present disclosure relates to the subject matter disclosed in German application No. 102 12 024.2 of Mar. 19, 2002, which is incorporated herein by reference in its entirety and for all purposes.

BACKGROUND OF THE INVENTION

The invention relates to an apparatus and to a method for separating flat parceled goods.

Such apparatuses and methods are known, for example, from DE 195 47 292 A1 or DE 196 09 068 A1.

DE 26 37 851 C2, DE 27 56 172 A1 and DE 76 26 319 U each disclose apparatuses and methods for separating individual parts.

Flat parceled goods (piece goods), for example letters or flat packets, are usually supplied in the form of stacks or bulk material. For further processing, the individual parceled goods articles have to be separated. This takes place automatically in a separating apparatus.

SUMMARY OF THE INVENTION

In accordance with the present invention, an apparatus and a method for separating flat parceled goods is provided which carry out a separating operation with a high degree of reliability.

In accordance with the invention, a driver device is provided with at least one driver surface, which is driven such that the parceled goods can be carried along in a transporting direction by the at least one driver surface, and a separating device is provided with at least one separating surface for the parceled goods, the separating surface being directed toward the at least one driver surface, and the separating device being driven such that the at least one separating surface moves, upon contact with a parceled goods article, in the opposite direction to the transporting direction.

In the case of the apparatus according to the invention, the separating device makes it possible to achieve a relative movement between parceled goods or a parceled goods stack (which comprises at least two parceled goods articles) between the at least one driver surface and the at least one separating surface. This makes it possible to produce a temporary difference in velocity between the parceled goods, and this then results in separation. Via the separating device, a piece-goods article can thus be, as it were, "pulled out" of a parceled goods stack without the throughflow being slowed down.

The apparatus according to the invention can be operated continuously, that is to say parceled goods may be fed continuously, separation then being ensured.

Such an apparatus is easy to produce in terms of design and production, it being possible to achieve the movement in opposite directions between the driver device and the separating device with low outlay and with the wear being minimized.

For example, it may be provided that the driver device and/or the separating device are/is realized by means of belt conveyors or by means of roller conveyors.

It is advantageous if a channel for the parceled goods is formed between the driver device and the separating device. The goods which are to be separated can then be guided through the apparatus according to the invention by means of such a transporting channel. The transporting channel here is bounded in particular by the driver surfaces and the separating surfaces and has a variable width. This ensures contact between the piece goods and the corresponding surfaces, so that it is possible to achieve a reliable separating result. A parceled goods article may then be gripped between the separating surfaces and the driver surfaces in order to be transported reliably through the apparatus according to the invention. It is also possible for a parceled goods stack made of at least two at least partially overlapping parceled goods to be gripped, on the one hand, by the separating device and, on the other hand, by the driver device. The relative movement between the separating device and driver device makes possible a relative movement between the parceled goods of this parceled goods stack, in order thus to effect separation.

It is particularly advantageous in production terms if the driver device comprises a circulating driver belt which has a driver side with a driver surface, which is guided in the transporting direction. This makes available a large continuous driver surface, so that it is possible to transport even thin and, in particular, flexible parceled goods such as letters without there being any risk of the parceled goods getting caught up. On account of the large driver surface available, it is possible to optimize this in order, in turn, to achieve an optimum driver result and separation result. The design-related outlay for transporting the driver device can be kept low by a drive roller which guides the driver belt being driven for example via a corresponding drive.

For the same reasons, it is advantageous if the separating device comprises a circulating separating belt which has a separating side with a separating surface, which is guided in the opposite direction to the transporting direction. The transporting channel is then formed between the separating surface and the driver surface. By a corresponding configuration of the separating device and of the driver device, it is also easily possible to configure an introduction region or a mouth region for bringing the parceled goods into the separating apparatus.

In particular, here, a velocity component of the separating device counter to the transporting direction is of smaller magnitude than a velocity component of the driver device in the transporting direction. This makes it possible to achieve optimum separating without the transportation of the parceled goods themselves being obstructed to any significant extent by the apparatus. The separating device can then be used to carry out the separating operation specifically, without having any significant influence on the parceled goods being carried along by the driver device.

In particular, the difference between the magnitudes of the velocity components of the driver device in the transporting direction and of the separating device in the opposite direction to the transporting direction lies in the range between 0.5 m/s and 3 m/s. In this range, with a relatively short separating-stage length in the order of magnitude of 0.5 m to 1 m, optimum separation results have been achieved even for very flat piece goods such as empty envelopes.

It is quite particularly advantageous if a driver surface is formed such that it has a higher coefficient of friction for the parceled goods than does a separating surface. This ensures that the parceled goods are transported via the driver device, while the separating device ensures the relative movement between the parceled goods of a stack of overlapping parceled goods in order thus, in turn, to effect separation.

In particular, a separating surface is formed such that the coefficient of friction for parceled goods is larger than the coefficient of friction between parceled goods surfaces. This makes it possible, via the separating device, for parceled goods which have their surfaces at least partially overlapping to be moved relative to one another, a parceled goods article which butts against a separating surface being carried along via this contact surface.

In order to achieve an optimized transportation and separation result, a driver surface is formed by means of a material with a high coefficient of friction for the piece goods. A rubber, and in particular natural rubber, material has proven advantageous here for parceled goods with a paper or cardboard surface such as letters or flat packets.

The separating device and/or the driver device are/is advantageously disposed and formed such that it is possible to vary a spacing between driver surfaces and separating surfaces. A separating stage is usually fed parceled goods which may overlap, in particular, in a randomly distributed manner, it also being possible for more than two parceled goods to overlap. It is intended for it to be possible for separated parceled goods which are spaced apart from one another to be removed at the outlet of the separating stage. As a result of it also being possible to vary the spacing, in particular, along the separating device and driver device, all possibilities which occur may be covered, namely that the separating stage is fed an already separated parceled goods article or a stack which may have different widths. In the case of a minimum spacing being correspondingly preset, it is possible to ensure that a separated piece-goods article is transported through the separating stage, while, as a stack passes through, it is ensured that a separating surface of the separating device is in abutment, so that the separating result is achieved.

In particular, the separating device and/or the driver device are/is mounted elastically such that it is possible to vary the spacing between driver surfaces and separating surfaces. The elastic mounting then makes it possible for this spacing to be adapted automatically to the current conditions, that is to say to the type of stack guided through. As a result, in turn, it is ensured at all times that, on the one hand, parceled goods are transported through the separating stage and, on the other hand, separation is achieved.

In particular, the separating device has resiliently mounted pressure-exerting rollers for a separating side, so that it is possible to set a minimum spacing between the separating side and the driver side and, in the case of the separating side being subjected to the action of force, it is possible to increase this spacing. The pressure-exerting rollers ensure guidance of a separating belt in order thus for it to be possible to set a certain minimum spacing, that is to say to set a certain transporting-channel width. This width is selected, that is to say set, such that even the flattest piece goods which are to be expected can be transported through. If thicker parceled goods or piece-goods stacks then arrive, it is then possible for the separating belt to yield via the resilient mounting, the contact between the separating surface and the piece goods which are to be separated nevertheless being ensured. Following separation, the separating side of the separating belt returns automatically into its starting position again in order thus, in turn, to ensure that individual parceled goods are transported through. It is advantageously possible here to set the abovementioned minimum spacing in order thus for it to be possible for the apparatus to be adapted to different types of parceled goods.

Furthermore, it is advantageous if a plurality of elastic holders, for example pressure-exerting rollers, are disposed along the driver device and/or the separating device. This then makes it possible to vary the spacing "locally", substantially over the entire length of a corresponding separating stage, in order thus to ensure the transportation and separation.

In the case of a variant of an embodiment, it is provided that the driver device comprises a first driver belt and a second driver belt which follows in the transporting direction, it being possible for the driver belts to be driven at different velocities. It may be provided here for the first driver belt to be driven with a smaller velocity component in the transporting direction than the following driver belt. The difference in velocity between the first driver belt and the transporting device is then smaller than the difference in velocity between the second driver belt and the transporting device. This makes it possible to carry out multistage separation in that, in the first stage, in particular multilayered stacks are reduced into stacks with fewer layers and, in the following stages, and in particular in a second stage, the definitive separation is then carried out.

It is advantageous in design terms if the driver device and the separating device are driven by the same motor. Using changeover devices, the different directions are then ensured and the difference in velocity is set correspondingly. This may take place, for example, via belt drives.

It is quite particularly advantageous if a driver surface is provided with spaced-apart driver elements. Contact surfaces for the parceled goods may then be formed on the driver elements. The spaced-apart driver elements have interspaces formed between them, it being possible for corresponding separating elements of the separating device to penetrate into these interspaces. This, in turn, makes it possible to prevent the separating device and the driver device from coming into contact if there are no parceled goods being guided through the transporting channel. This minimizes the friction between the driver device and the separating device, so that the occurrence of abrasion is minimized. The apparatus according to the invention may then also be operated in "idling" mode if no parceled goods are being guided through, that is to say the relative movement between the driver device and separating device need not be deactivated. It is also possible to set a very small spacing between the driver device and the separating device, so that even very flat piece goods can be carried along.

In particular, the driver elements are formed by strip-like elevations extending in the transporting direction. For the elevations, it is then possible to use a material which has a high coefficient of friction for the parceled goods, in order for the latter to be carried along. By extending in the transporting direction, it may also be ensured that the parceled goods are always in contact with the driver surface as they are guided through the transporting channel. Furthermore, there is no need to use as much of the material with the high coefficient of friction since this material does not have to cover the entire width of the transporting channel.

In order for it to be possible to penetrate into one or more interspaces between spaced-apart driver elements, a separating surface is provided with at least one separating element. In particular, separating elements are formed by strip-like elevations extending in the transporting direction.

The driver elements here are advantageously disposed such that a separating element of the separating device can penetrate into an interspace between spaced-apart driver elements when the spacing between a driver surface and a separating surface is reduced. This prevents contact between the driver surface and the separating surface if there is no piece-goods article located between the two. This, in turn, minimize abrasion on the driver device and separating device.

It is advantageous if a deflecting roller for the driver device and/or the separating device is formed such that it can raise a piece-goods article away from the driver device and/or separating device. Such a deflecting roller can then be used, in particular at the end of a separating stage, to raise off a separated parceled goods article from a driver belt and/or separating belt, in order then to be able to transfer this piece-goods article reliably to a continued-transportation device. This prevents, in particular, a piece-goods article from adhering to the driverdevice, which could result in problems in the transfer of the separated parceled goods. Furthermore, such a deflecting roller may then also pass on to a separated piece-goods article, during transfer to a continued-transportation device, a velocity component in the transporting direction, so that the spacing between separating piece-goods articles may also be increased in this way.

In particular, the deflecting roller has at least one abutment element for the parceled goods, the outer side of this abutment element being spaced apart from an axis of the deflecting roller to a greater extent than a driver surface. This makes it possible for a separated piece-goods article to be raised away, that is to say released, from the driver surface. This raising-away action takes place automatically since the deflecting roller rotates.

An abutment element is advantageously produced from a material which has a high coefficient of friction for the piece goods, this ensuring the raising-away capability and also the transfer at a velocity which corresponds substantially to the rotary velocity of the deflecting rollers.

In particular, a plurality of spaced-apart abutment elements are provided, the spacing between maximally spaced-apart abutment elements being smaller than a width of the parceled goods in the spacing direction. This ensures that even the smallest piece goods can be raised away.

An abutment element can easily be formed, in design terms, by a round cord ring, which is correspondingly arranged on the deflecting roller and, in particular, incorporated therein.

It is possible, in principle, for parceled goods to be transported and separated in the vertically upright or horizontally lying position. For example, the apparatus is disposed such that an axis of rotation of a drive roller for the driver device is located transversely to the horizontal and, in particular, substantially parallel to the direction of gravitational force. A lower end of the parceled goods is then guided with sliding action, for example, on a slide plate or guided through the apparatus via a separate transporting belt.

It may also be provided, however, that the apparatus is disposed such that an axis of rotation of a drive roller is located substantially parallel to the horizontal, that is to say transversely to the direction of gravitational force.

It is advantageous if a continued-transportation device is disposed downstream, as seen in the transporting direction, of the driver device with separating device located opposite. If the continued-transportation device is driven with a larger velocity component in the transporting direction than the driver device, then it is thus possible to increase the spacing between the separated parceled goods. This simplifies a downstream processing operation.

For example, a means of freeing the parceled goods is disposed downstream, as seen in the transporting direction, of the driver device with separating device located opposite. This makes it possible to realize an automatic processing center for the piece goods in which automatic processing can be achieved without manual intervention.

In accordance with the present invention, a method for separating flat parceled goods is provided, with carrying the parceled goods along in a transporting direction via driver surfaces moving in the transporting direction, and driving separating surfaces directed toward the driver surfaces with a velocity component in the opposite direction to the transporting direction.

This method has the advantages which have already been explained in conjunction with the apparatus according to the invention.

Further advantageous configurations have already been explained in conjunction with the apparatus according to the invention.

In particular, it is advantageous if a transporting channel for the parceled goods is bounded by the driver surfaces and separating surfaces located opposite. With a minimal spacing being set, this makes it possible to achieve an optimum separation result even for flat parceled goods.

Furthermore, it is advantageous if the driver surfaces have a higher coefficient of friction for the parceled goods than the separating surfaces and if the latter have a higher coefficient of friction for the parceled goods than parceled goods surfaces. This then ensures, on the one hand, that the parceled goods are carried along in the transporting direction and, on the other hand, that overlapping parceled goods are moved relative to the parceled goods butting against the driver surfaces, that is to say are detached from one another, in order thus to achieve a separation result.

The following description of preferred embodiments serves, in conjunction with the drawing, to explain the invention in more detail.

DETAILED DESCRIPTION OF THE INVENTION

Figure 1:
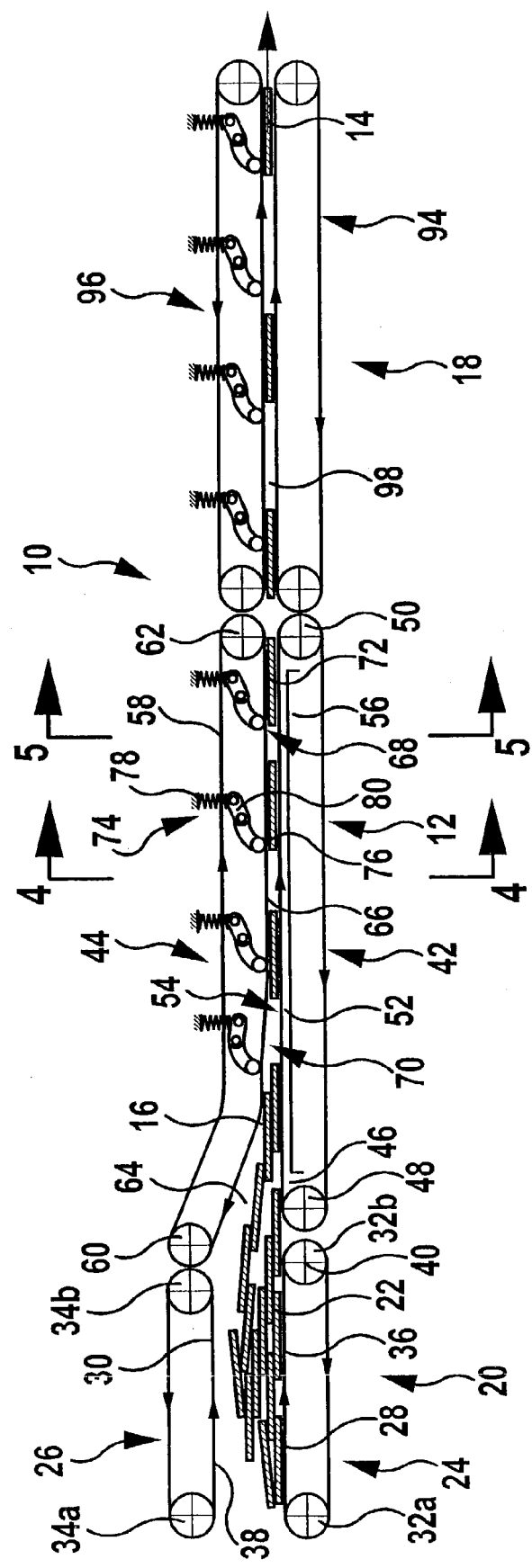
FIG. 1 shows a plan view of an exemplary embodiment of an apparatus according to the invention.

A first exemplary embodiment of an apparatus in accordance with the invention for separating flat parceled goods (piece goods), this apparatus being designated 10 overall in FIG. 1, comprises a separating stage 12 and a continued-transportation stage 18 which follows in a transporting direction 14 for the flat piece goods 16. Disposed upstream of the separating stage 12 is a feeding stage 20, via which the piece goods 16 can be fed to the separating stage 12 and introduced into the same.

The piece goods which are to be separated are, for example, letters and/or in particular thin packets. The piece goods 16 may have different thicknesses and sizes here. The piece goods 16 are fed to the separating stage 12, via the feeding stage 20, for example in the manner of bulk material (indicated by the stack of letters 22).

In the case of the first exemplary embodiment shown in FIG. 1, the feeding stage 20 comprises two spaced-apart, substantially parallel belt conveyors 24 and 26. These each have a circulating transporting belt 28, 30 which is guided and driven over deflecting rollers 32a, 32b and 34a, 34b. A transporting side 36 or 38 of the respective belt conveyor 24 or 26 is driven here such that it moves in the transporting direction 14 and thus carries along the piece goods 16 out of the stack 22.

It may be provided that the piece goods are guided in the vertically upright position, that is to say the apparatus 10 is formed such that surface normals of the piece goods 16 are located transversely to the direction of gravitational force. In this case, axes of rotation 40 of the deflecting rollers 32a, 32b and 34a, 34b are oriented transversely to the horizontal (which is the plane of the drawing in FIG. 1) and, in particular, are oriented substantially parallel to the direction of gravitational force.

It may also be provided, however, that the piece goods 16 are transported in the horizontally lying position, that is to say the belt conveyors 24, 26 are disposed such that the corresponding axes of rotation 40 are located transversely to the direction of gravitational force (not shown in the drawing).

The separating stage 12 comprises a driver device 42 and, spaced apart from the latter, a separating device 44.

The driver device 42 is formed, for example, as a belt conveyor which follows the belt conveyor 24 in the transporting direction 14. A driver belt 46 here is guided over deflecting rollers 48, 50, at least one deflecting roller, for example the deflecting roller 50 directed toward the continued-transportation stage 18, being driven. A driver side 52 of the driver belt 46 has a driver surface 54, the circulating driver belt 46 being driven such that the driver side 52 moves in the transporting direction 14 and thus carries along the piece goods 16 in this transporting direction 14.

The driver device 42 is disposed such that the transporting belt 28 of the feeding stage 20 and the driver belt 46 are substantially aligned with one another.

In order to guide the driver belt 46 in the driver device 42, it is possible to provide a directing plate 56, which guides the rear side of the driver belt 46, the rear side being directed away from the driver side 52, between the two deflecting rollers 48 and 50.

The separating device 44 likewise comprises a circulating belt 58, which is guided over deflecting rollers 60 and 62. In the case of the exemplary embodiment shown in FIG. 1, the spacing between the deflecting roller 60 of the separating device 44 and deflecting roller 48 of the driver device 42, these rollers being directed toward the feeding stage 20, is larger than the spacing between the corresponding deflecting rollers 62 and 50, which are directed toward the continued-transportation stage 18. An introduction region 64 with a mouth-like widening between the belt 58 and the driver belt 46 is thus formed, in the direction of the feeding stage 20, between the driver device 42 and the separating device 44, in order for it thus to be possible to bring a stack 22 of planar piece goods 16 into the separating stage 12. The introduction region 64 here tapers in the transporting direction, so that the separating device 44 can come into contact with the planar piece goods 16.

A separating side 66 of the belt 58 with a separating surface 68 is directed toward the driver surface 54 of the driver belt 46 and is spaced apart therefrom. The belt 58 here is driven such that the separating side is guided in the opposite direction to the transporting direction 14.

A transporting channel 70, in which the flat piece goods 16 are guided through the separating stage 12, is thus formed between the separating side 66 of the belt 58 of the separating device 44 and the driver side 52 of the driver device 42. One boundary surface of this transporting channel 70, namely the driver side 52 of the driver device 42, moves in the transporting direction 14, while the other boundary surface, the separating side 66 of the separating device 44, moves in the opposite direction to the transporting direction 14.

The separating device 44 here is preferably driven such that the belt 58 moves at a lower speed in the direction 72, as the opposite direction to the transporting direction 14, than the driver belt 46 with its driver surface 54 in the transporting direction 14. The difference in speeds typically lies in the range between 0.5 m/s and 3 m/s, in particular if the separating stage 12 is used for separating letters or thin packets.

A plurality of spaced-apart, elastically mounted pressure-exerting-roller devices 74 are provided for guiding and mounting the separating side 66 of the separating device 44. These pressure-exerting-roller devices each have a roller element 76, on which the rear side of the belt 58, this rear side being directed away from the separating side 66, is guided in abutment. The roller element 76, in turn, is retained on a framework for the apparatus 10, for example, via a spring 78. The height position of the roller element 76 in relation to the driver belt 46 here can be set, for example, via the setting of an angle position of a connecting element 80 between the roller element 76 and the spring 78. It is thus possible, via the connecting element 80 of the respective pressure-exerting-roller means 74, to set the (minimum) width of the transporting channel 70 in the direction transverse to the transporting direction 14.

The spring 78 is, in particular, a compression spring which can be compressed such that, in the region of the corresponding roller element 76, the transporting channel 70 can be widened by the driver belt 46 counter to the force of the spring 78. This ensures that, with a corresponding setting of the spacing between the roller elements 76 and the driver belt 46, without force being applied to the springs 78, there is contact between the separating surface 68 and a piece-goods article 16, in particular if a stack of piece goods is guided in the transporting channel 70.

The transporting channel 70 is bounded in the downward direction (parallel to the plane of the drawing in FIG. 1), for example, by a directing plate 82 (FIGS. 4 and 5), on which the piece goods 16 are guided with sliding action in the vertically upright position. It may also be provided, however, that the transporting channel 70 is bounded in this plane by a driven transporting belt, the latter being driven in particular at substantially the same speed in the transporting direction 14 as the driver belt 46.

Figure 4:
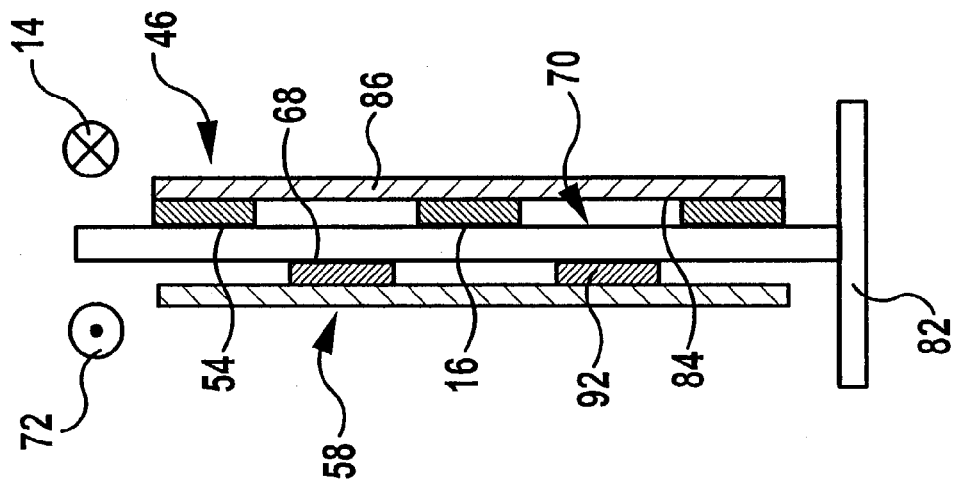
FIG. 4 shows a sectional view along line 4—4 according to FIG. 1.
Figure 5:
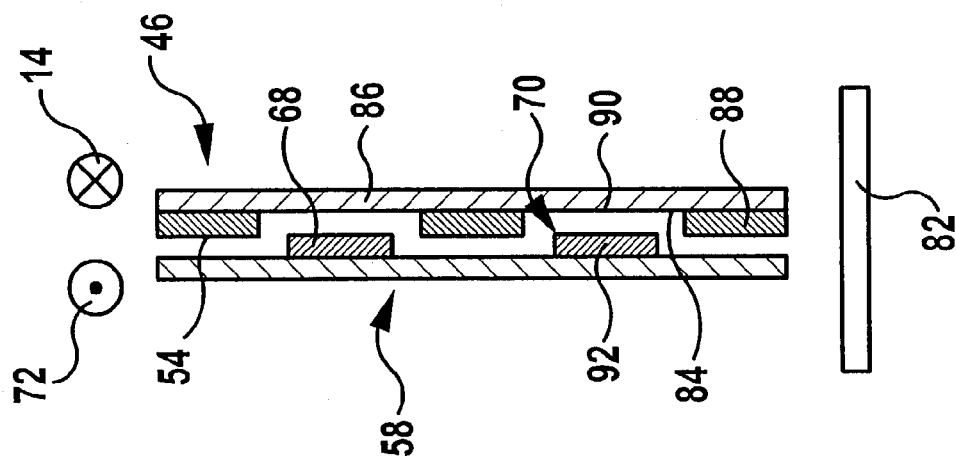
FIG. 5 shows a sectional view along line 5—5 according to FIG. 1.

As is shown in FIGS. 4 and 5, the driver side 52 of the driver belt 46 is provided with a material which has a high coefficient of friction for the piece goods 16. This ensures that the piece goods 16 are carried along by the driver belt 46. For example, spaced-apart strip-like elevations 88 are disposed, as driver elements, on an upper surface 84 of a conventional belt 86, interspaces 90 thus being located between these elevations. The elevations 88 here extend in the longitudinal direction of the driver belt 46, this direction being substantially parallel to the transporting direction 14. These strips 88 are produced, for example, from natural rubber.

The separating side 66 of the belt 58 is formed such that the separating surface 68 has a smaller coefficient of friction for the piece goods 16 than the driver surface 54. The corresponding coefficient of friction, however, is larger than the coefficient of friction between piece-goods surfaces.

The relative movement in opposite directions between the driver belt 46 and the belt 58 of the separating device 44 at the transporting channel 70 thus allows piece goods which overlap in the transporting channel 70 to be detached from one another. The piece-goods article butting against the driver surface 54 is guided more quickly in the transporting channel 70 than the piece-goods article butting against the separating surface 68 and, with a sufficiently long formation of the transporting channel 70, separation is thus achieved.

With corresponding dimensioning of the introduction region 64 and corresponding dimensioning of the length of the transporting channel 70, it is then possible for a stack 22, for example a stack of letters, to be separated as it runs through the separating stage 12 such that, at the end of the latter, separated, spaced-apart piece goods 16 are transferred to the continued-transportation stage 18.

The belt 58 of the separating device 44 is likewise provided, in the direction toward the driver surface 54 of the driver belt 46, with spaced-apart elevations 92 as separating elements, which correspondingly form the separating surface 68. These elevations 92 are disposed and dimensioned such that, if there is no piece-goods article 16 located in the transporting channel 70 between the driver surface 54 and the separating surface 68, they can penetrate into the interspaces 90 of the driver side 52 of the driver belt 46 and thus do not come into contact with the elevations 88 of the driver belt 46.

This avoids rubbing of the driver belt 46 against the belt 58 of the separating device 44 and thus minimizes the abrasion and so, in turn, the wear of these two belts. At the same time, however, the separating function is ensured since the corresponding elevations 88 and 92 ensure the optimum setting for the frictional adherence of the piece goods 16 to the two belts 46 and 58.

In particular, the separating stage 12 according to the invention can even be operated when piece goods 16 are only guided intermittently through the separating stage 12 since, even in "idling" mode without any piece goods 16 in the transporting channel 70, contact between the driver belt 46 and the belt 58 of the separating device 44 is substantially avoided.

The continued-transportation stage 18 comprises, for example, two spaced-apart belt conveyors 94 and 96, between which is formed a transporting channel 98 which follows the transporting channel 70 of the separating stage 12 and, in particular, is aligned therewith. The corresponding belts of the belt conveyors 94 and 96 here are driven in parallel in the transporting channel 98 in order thus to continue the transportation of the separating piece goods.

The belts of the belt conveyors 94 and 96 are driven synchronously and, in particular, at the same speed. The speed of these belts in the transporting direction 14 is preferably higher than that of the driver belt 46 of the separating stage 12. This makes it possible to increase the spacing of the separated piece goods 16 which are supplied by the separating stage 12.

Figure 2:
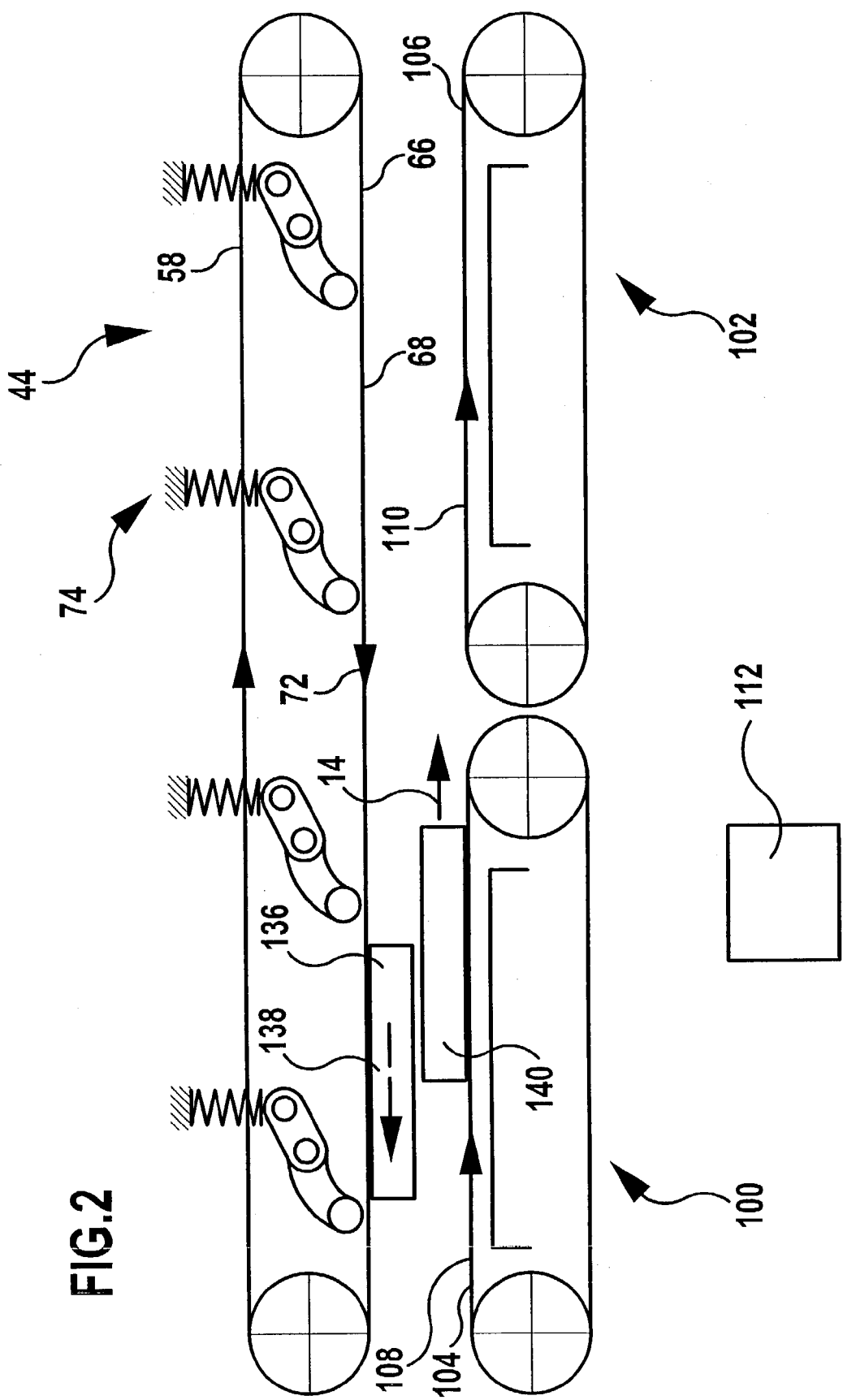
FIG. 2 shows a view, in detail form, of a variant of an exemplary embodiment.

In the case of a variant of an exemplary embodiment shown in FIG. 2, the separating device 44 is basically formed in the same way as has been described above. The driver device in this case, however, comprises two circulating driver belts 100 and 102 arranged one behind the other in the transporting direction 14. The respective driver belts 100, 102 here are basically formed in the same way as has been described above with reference to the driver belt 46. They each have a driver side 104, 106, these being driven in the transporting direction 14 by way of respective driver surfaces 108, 110.

It is provided here that the driver belt 100, which is closest to the feeding stage 20, is driven at a lower speed than the driver belt 102, which is directed toward the continued-transportation stage 18, for example at a speed which is reduced by approximately 10%. This makes it possible to optimize separation in that for example in a first stage, via the driver belt 100, stacks with a plurality of piece goods are separated into stacks with fewer piece goods and in a second stage, via the driver belt 102, these smaller stacks are then, finally, separated altogether.

A common motor 112 is preferably provided for driving the driver device 42 and the separating device 44, corresponding changeover devices making provision for corresponding differences in direction and, if appropriate, differences in speed (if the driver device has a plurality of driver belts). For example, a motor drives, via correspondingly changed-over drive belts, the respective deflecting rollers for the purpose of moving the driver belts and the belt 58.

Figure 3:
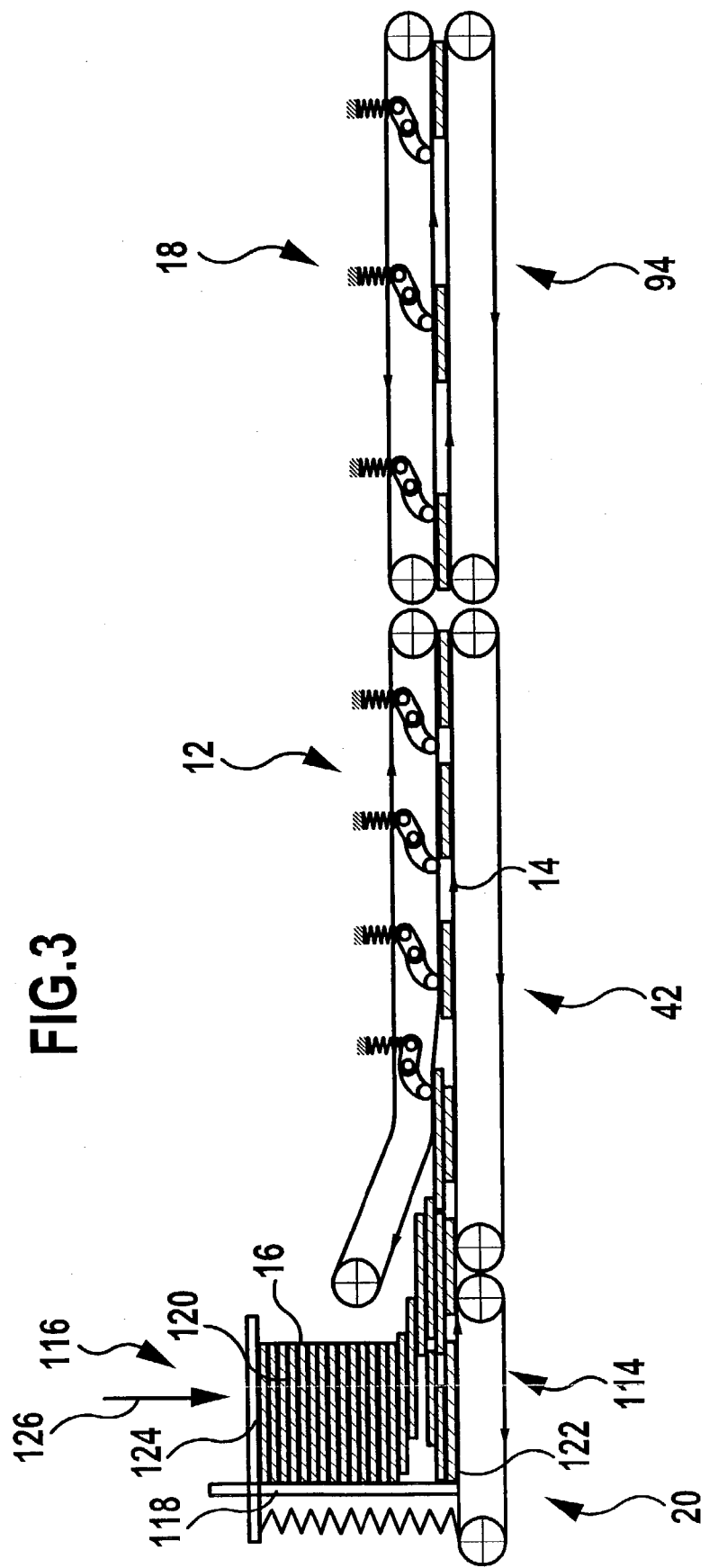
FIG. 3 shows a plan view of a second exemplary embodiment of the apparatus according to the invention.

In the case of a second exemplary embodiment, which is shown in FIG. 3, the separating stage 12 and the continued-transportation stage 18 are basically formed in the same way as has been described with reference to the first exemplary embodiment.

The feeding stage 20 here, again, comprises a belt conveyor 114, which is basically formed in the same way as the belt conveyor 24. This belt conveyor 114 is fed the piece goods 16, stacked in the form of ordered groups, via a stack-feeding means 116. The latter has a first abutment surface 118 for such a stack 120, this abutment surface being oriented transversely to the belt 122 of the belt conveyor 114. Also provided is a second abutment surface 124, which is oriented transversely to the first abutment surface 118. The second abutment surface 124 here can be displaced in the direction of the belt 122, so that, by the action of force in a direction 126 transverse to the transporting direction 14, the stack 120 can be brought into contact with the belt 122.

Since the belt 122 moves in the transporting direction 14, it carries along piece goods, from the stack 120, which are directed toward it, and transports these piece goods into the separating stage 12 via the introduction region 64.

Otherwise, the apparatus according to the second exemplary embodiment functions in the same way as has been described above.

In the case of the apparatus according to FIG. 3 being disposed such that the piece goods 16 are guided in the vertically upright position, an external force is necessary for the purpose of forcing the second abutment surface 124 in the direction of the belt 122. If the apparatus is disposed such that the piece goods 16 can be transported in the horizontally lying position, the direction 126 then being substantially parallel to the direction of gravitational force, the gravitational force is sufficient, in some circumstances, for it to be possible for the piece goods 16 to be transported into the separating stage 12.

Figure 6:
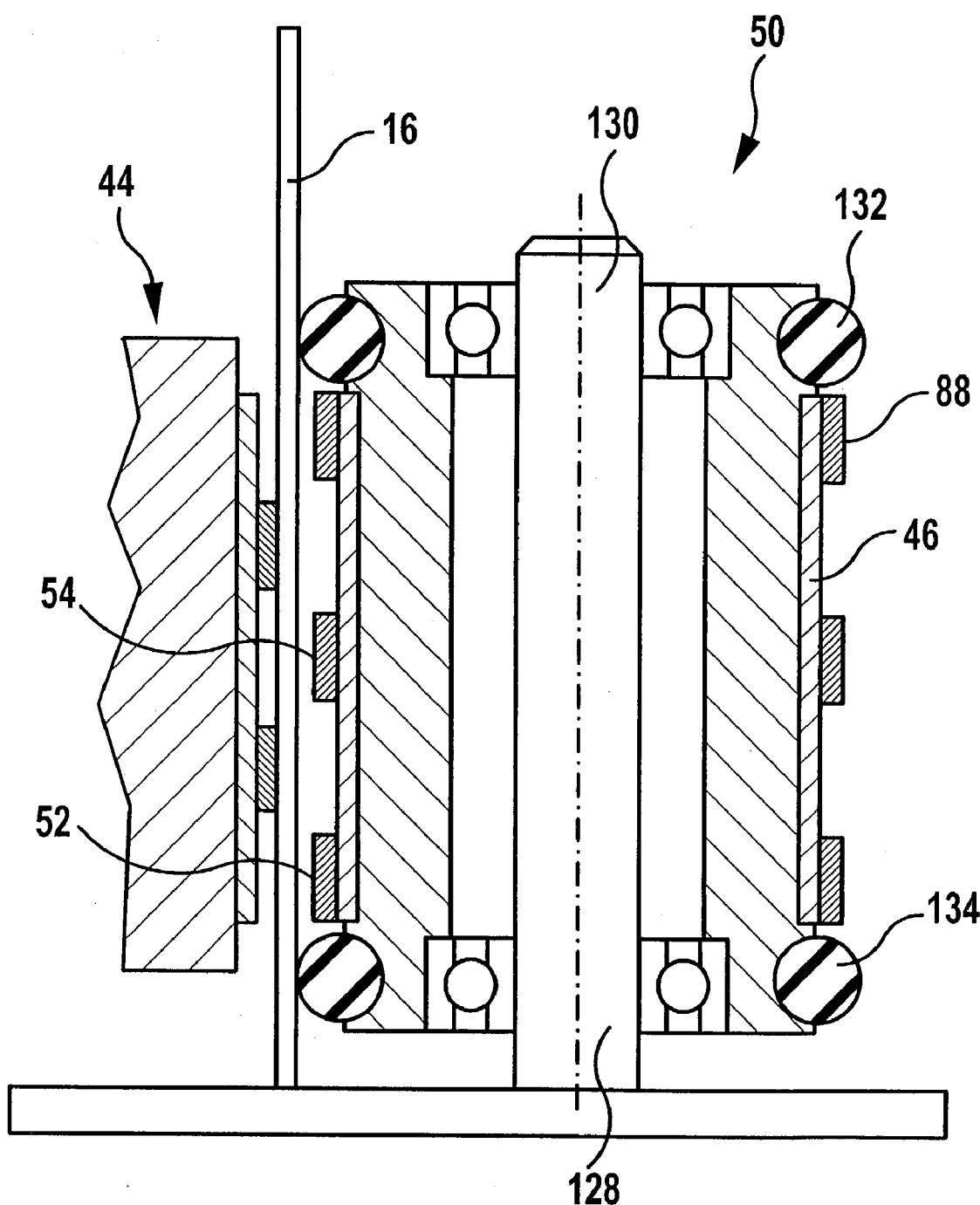
FIG. 6 shows a sectional view of an exemplary embodiment of a deflecting roller.

In the case of a variant of an embodiment shown in FIG. 6, the deflecting roller 50 of the separating stage 12, this roller being directed toward the continued-transportation stage 18, is formed such that it can raise a piece-goods article 16 in the transporting direction 14 during transfer to the continued-transportation stage 18. The deflecting roller can be rotated about an axis of rotation 130 via a shaft 128, this axis of rotation being oriented substantially parallel to the direction of gravitational force when the piece goods 16 are transported in the vertically upright position. The driver belt 46 with its elevations 88 is guided on the deflecting roller 50 and, by means of the latter, driven in the transporting direction 14 by way of its driver side 52.

In the region of its ends, the deflecting roller 50 has an abutment element 132, 134 in each case, which is formed, for example, as a round cord ring. A spacing between these two abutment elements 132 and 134 here is smaller than a minimum dimension of a piece-goods article 16 in this direction, so that the two abutment elements 132 and 134 can butt against one piece-goods article 16.

A spacing between the axis of rotation 130 and that side of an abutment element 132 which is directed toward the separating device 44 is larger than the spacing between the axis of rotation 130 and the driver surface 54 of the driver belt 46. The abutment elements 132, 134 on the deflecting roller 50 thus project beyond the driver belt 46.

The abutment elements 132, 134 are preferably produced from a material which has a high coefficient of friction for the piece goods 16.

The deflecting roller 50 is preferably driven. If the piece goods 16, which are separated in the separating stage 12 and transported through the transporting channel 70 by the driver belt 46, reach the deflecting roller 50, then they are raised away from the driver belt 46, that is to say released therefrom, via the abutment elements 132, 134. This ensures optimum transfer to the continued-transportation stage 18, the rotation of the deflection roller 50 resulting in the piece-goods article not being braked to any substantial extent.

It is also possible for the corresponding deflecting roller 62 of the separating device to be formed in the same way as has been described for the deflecting roller 50.

The continued-transportation stage 18 may be followed, for example, by a means for freeing the piece goods, which have been correspondingly separated beforehand, so that access can be gained to each piece-goods article individually.

The apparatus according to the invention for separating planar piece goods functions as follows:

The piece goods 16 are fed to the separating stage 12, for example, via stacks of piece goods or in the form of bulk material. In the separating stage, they are transported in the transporting direction 14 in the transporting channel 70. The transporting channel 70 is bounded by a driver side 52 of one or more driver belts 46 or 100, 102 which move in the transporting direction 14.

Disposed at a minimum spacing from these driver belts 46 or 100, 102 is a belt 58 of a separating device 44, which is driven in the opposite direction to the transporting direction 14 by way of the separating side 66, which is directed toward the driver side 52. The minimum spacing here is set such that even the flattest piece goods which are to be expected can be transported through the separating stage 12.

The driver belt 46 or 100, 102, in respect of its driver surface 54 or 108, 110, has a large coefficient of friction for the piece goods 16, so that the latter are carried along. The belt running in the opposite direction has a smaller coefficient of friction, so that, as is indicated by the arrow 136 in FIG. 2, a piece-goods article 138 which butts against the separating side 66 moves relative to a piece-goods article 140 which butts against the driver side 52. This relative movement direction 136 runs in the opposite direction to the transporting direction 14. As a result, the piece-goods article 140 which butts against the driver side 52 then has a larger speed component in the transporting direction 14 and the two piece goods 138 and 140 are released from one another, that is to say are separated.

The elastic mounting of the separating side 66 of the belt 58 of the separating device 44 via the pressure-exerting-roller means 74 makes it possible to ensure that the width of the transporting channel 70 is adapted to the quantity of piece goods 16 transported therein, the desired separation result nevertheless being achieved, the result being complete separation at the end of the separating stage 12.

Since the driver side 52 of the driver device 42 and the separating side 66 of the separating device 44 are configured in coordination with one another, so that the abrasion is minimized, a long service life may be achieved, it also being possible for the apparatus to be operated in "idling" mode.

Providing the deflecting roller 50 and/or the deflecting roller 62, which are directed toward the continued-transportation stage 18, with abutment elements makes it possible for the separated piece goods to be released from the belts; this, in turn, allows the separated piece goods 16 to be transferred effectively to the continued-transportation stage 18.

If the continued-transportation stage 18 is operated at a greater speed than the driver device 42, then it is possible to increase the spacing between the separating piece goods 16, in order thus to facilitate further processing, for example the operation of freeing the piece goods.

The invention claimed is:

1. Apparatus for separating flat parceled goods, comprising:
   a driver device with at least one driver surface, which is driven such that the parceled goods can be carried along in a transporting direction by at least one driver surface; and
   a separating device with at least one separating surface for the parceled goods, the separating surface being directed toward the at least one driver surface;
   wherein the separating device being moveable in an opposite direction to the transporting direction, and the driver surface having a coefficient of friction that is higher than a coefficient of friction of the separating surface.

2. Apparatus according to claim 1, wherein
a channel for the parceled goods is formed between the driver device and the separating device.

3. Apparatus according to claim 1, wherein
the driver device comprises a circulating driver belt which has a driver side which is guided in the transporting direction.

4. Apparatus according to claim 1, wherein
the separating device comprises a circulating separating belt which has a separating side including the separating surface, said separating surface being guided in the opposite direction to the transporting direction.

5. Apparatus according to claim 1, wherein
a velocity component of the separating device moving counter to the transporting direction is of smaller magnitude than a velocity component of the driver device in the transporting direction.

6. Apparatus according to claim 5, wherein
the difference between the magnitudes of the velocity components in the transporting direction of the driver device and of the separating device in the opposite direction to the transporting direction lies in the range between 0.5 m/s and 3 m/s.

7. Apparatus according to claim 1, wherein
the separating surface is formed such that the coefficient of friction for parceled goods is larger than the coefficient of friction between parceled goods surfaces.

8. Apparatus according to claim 1, wherein
the driver surface is formed by means of a material with a high coefficient of friction for the parceled goods.

9. Apparatus according to claim 8, wherein
the driver surface is formed by means of a rubber material.

10. Apparatus according to claim 1, wherein
at least one of the separating device or the driver device is formed and disposed such that it is possible to vary the spacing between the driver surface and separating surface.

11. Apparatus according to claim 10, wherein
at least one of the separating device or the driver device is mounted elastically such that it is possible to vary the spacing between the driver surfaces and separating surfaces.

12. Apparatus according to claim 10, wherein
the separating device has resiliently mounted pressure-exerting rollers for a separating side, so that it is possible to set a minimum spacing between the separating side and the driver side and, it is possible to increase this spacing when force is exerted on the separating side.

13. Apparatus according to claim 10, wherein
a plurality of elastic holders is disposed along at least one of the driver device or separating device.

14. Apparatus according to claim 1, wherein the driver device comprises a first driver belt and a second driver belt which follows in the transporting direction, the driver belts being drivable at different velocities.

15. Apparatus according to claim 14, wherein
the first driver belt is driven with a smaller velocity component in the transporting direction than the following driver belt.

16. Apparatus according to claim 1, wherein
the driver device and the separating device are driven by the same motor.

17. Apparatus according to claim 1, wherein
the driver surface is provided with spaced-apart driver elements.

18. Apparatus according to claim 17, wherein
the driver elements are formed by strip-like elevations extending in the transporting direction.

19. Apparatus according to claim 17, wherein
the driver elements are disposed such that a separating element of the separating device can penetrate into an interspace between spaced-apart driver elements when the spacing between the driver surfaces and the separating surfaces is reduced.

20. Apparatus according to claim 1, wherein
the separating surface is provided with at least one separating element.

21. Apparatus according to claim 20, wherein
the at least one separating element is formed by a strip-like elevation extending in the transporting direction.

22. Apparatus according to claim 1, wherein
a deflecting roller for at least one of the driver device or the separating device is formed such that it can raise a parceled goods article from the driver device and/or separating device.

23. Apparatus according to claim 22, wherein
the deflecting roller has at least one abutment element for the parceled goods, the outer side of this abutment element being spaced apart from an axis of the deflecting roller to a greater extent than a driver surface or a separating surface.

24. Apparatus according to claim 23, wherein
the abutment element is produced from a material which has a high coefficient of friction for the parceled goods.

25. Apparatus according to claim 23, wherein
the deflecting roller includes a plurality of spaced-apart abutment elements for the parceled goods, the spacing between maximally spaced-apart abutment elements being smaller than a width of the parceled goods in the spacing direction.

26. Apparatus according to claim 23, wherein
the abutment element is formed by a round cord ring.

27. Apparatus according to claim 1, wherein said apparatus is disposed such that an axis of rotation of a drive roller for the driver device is located transversely to the horizontal.

28. Apparatus according to claim 1, wherein
said apparatus is disposed such that an axis of rotation of a drive roller is located substantially parallel to the horizontal.

29. Apparatus according to claim 1, wherein
a continued-transportation device is disposed downstream, as seen in the transporting direction, of the driver device with separating device located opposite said driver device.

30. Apparatus according to claim 29, wherein
the continued transportation device is driven with a larger velocity component in the transporting direction than the driver device.

31. Apparatus according to claim 1, wherein
a device for freeing the parceled goods is disposed downstream, as seen in the transporting direction, of the driver device with separating device located opposite.

32. Method for separating flat parceled goods, comprising the steps:
carrying the parceled goods along in a transporting direction via driver surfaces moving in the transporting direction; and
separating the parceled goods by driving separating surfaces directed toward the driver surfaces with a velocity component in the opposite direction to the transporting directions,
wherein the driver surfaces have a higher coefficient of friction than the separating surfaces.

33. Process according to claim 32, wherein
a transporting channel for the parceled goods is bounded by the driver surfaces and separating surfaces located opposite.

34. Process according to claim 32, wherein
the separating surfaces have a higher coefficient of friction for the parceled goods than parceled goods surfaces.

35. Apparatus for separating flat parceled goods, comprising:
a driver device with at least one driver surface, which is driven such that the parceled goods can be carried along in a transporting direction by at least one driver surface, the driver surface being formed by means of a rubber material with a high coefficient of friction for the parceled goods; and
a separating device with at least one separating surface for the parceled goods, the separating surface being directed toward the at least one driver surface,
wherein the separating device being moveable in an opposite direction to the transporting direction.

36. Apparatus for separating flat parceled goods, comprising:
a driver device with at least one driver surface, which is driven such that the parceled goods can be carried along in a transporting direction by at least one driver surface, the driver surface including spaced-apart driver elements, and the driver elements being formed by strip-like elevations extending in the transporting direction; and a separating device with at least one separating surface for the parceled goods, the separating surface being directed toward the at least one driver surface, wherein the separating device being moveable in an opposite direction to the transporting direction.

37. Apparatus for separating flat parceled goods, comprising:

a driver device with at least one driver surface, which is driven such that the parceled goods can be carried along in a transporting direction by at least one driver surface; and a separating device with at least one separating surface for the parceled goods, the separating surface being directed toward the at least one driver surface, and having at least one separating element, the at least one separating element being formed by a strip-like elevation extending in the transporting direction, wherein the separating device being moveable in an opposite direction to the transporting direction.

38. Apparatus for separating flat parceled goods, comprising:

a driver device with at least one driver surface, which is driven such that the parceled goods can be carried along in a transporting direction by at least one driver surface;

a separating device with at least one separating surface for the parceled goods, the separating surface being directed toward the at least one driver surface, wherein the separating device being moveable in an opposite direction to the transporting direction; and a deflecting roller for at least one of the driver device or the separating device being formed such that it can raise a parceled goods article from the driver device or separating device.

39. Apparatus for separating flat parceled goods, comprising:

a driver device with at least one driver surface, which is driven such that the parceled goods can be carried along in a transporting direction by at least one driver surface; and a separating device with at least one separating surface for the parceled goods, the separating surface being directed toward the at least one driver surface, wherein the separating device being moveable in an opposite direction to the transporting direction, and the apparatus being disposed such that an axis of rotation of a drive roller is located substantially parallel to the horizontal.

40. Apparatus for separating flat parceled goods, comprising:

a driver device with at least one driver surface, which is driven such that the parceled goods can be carried along in a transporting direction by at least one driver surface; and a separating device with at least one separating surface for the parceled goods, the separating surface being directed toward the at least one driver surface;

wherein the separating device being moveable in an opposite direction to the transporting direction; and a device for freeing the parceled goods being disposed downstream, as seen in the transporting direction, of the driver device with the separating device being located opposite.

* * * * *